(12) United States Patent
Fakoorian et al.

(10) Patent No.: US 11,533,738 B2
(45) Date of Patent: Dec. 20, 2022

(54) JOINT ACTIVATION AND/OR RELEASE FOR MULTIPLE CONFIGURED GRANT AND/OR SEMI-PERSISTENT SCHEDULING CONFIGURATIONS

(71) Applicant: QUALCOMM Incorporated, San Diego, CA (US)

(72) Inventors: Seyed Ali Akbar Fakoorian, San Diego, CA (US); Wei Yang, San Diego, CA (US); Jing Sun, San Diego, CA (US); Seyedkianoush Hosseini, San Diego, CA (US); Xiaoxia Zhang, San Diego, CA (US); Mostafa Khoshnevisan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/803,735

(22) Filed: Feb. 27, 2020

(65) Prior Publication Data

US 2020/0413424 A1  Dec. 31, 2020

Related U.S. Application Data

(60) Provisional application No. 62/868,632, filed on Jun. 28, 2019.

(51) Int. Cl.
*H04W 72/12* (2009.01)
*H04L 1/18* (2006.01)
(Continued)

(52) U.S. Cl.
CPC ....... *H04W 72/1257* (2013.01); *H04L 1/1819* (2013.01); *H04W 72/042* (2013.01);
(Continued)

(58) Field of Classification Search
CPC ... H04L 1/1812; H04L 1/1861; H04L 5/0048; H04L 5/0055; H04L 5/0091; H04L 5/14
See application file for complete search history.

(56) References Cited

U.S. PATENT DOCUMENTS

| 10,630,431 B2* | 4/2020 | Fan ........................ H04L 1/0003 |
| 2010/0150089 A1* | 6/2010 | Yu ..................... H04W 52/0216 |
| | | 370/329 |

(Continued)

FOREIGN PATENT DOCUMENTS

| WO | WO-2019092859 A1 * | 5/2019 | ........... H04L 5/0055 |
| WO | 2020164539 A1 | 8/2020 | |

OTHER PUBLICATIONS

CATT: "Discussion on Enhanced UL Configured Grant Transmission," 3GPP Draft, 3GPP TSG RAN WG1 Meeting #97, R1-1906332, vol. RAN WG1. No. Reno, USA, May 13, 2019-May 17, 2019, May 13, 2019 (May 13, 2019), XP051727782, 6 pages, Retrieved from the Internet: URL: http://www.3gpp.org/ftp/Meetings%5F3GPP%5FSYNC/RAN1/Docs/R1%2D1906332%2Ezip the whole document.

(Continued)

*Primary Examiner* — Khaled M Kassim
*Assistant Examiner* — Berhanu D Belete
(74) *Attorney, Agent, or Firm* — Harrity & Harrity, LLP (57) ABSTRACT

Various aspects of the present disclosure generally relate to wireless communication. In some aspects, a user equipment (UE) may receive a single downlink control information (DCI) message. The UE may map a bit sequence in the single DCI message to a configuration set that includes multiple downlink semi-persistent scheduling configurations or multiple uplink configured grant configurations to be jointly activated or released. Numerous other aspects are provided.

33 Claims, 4 Drawing Sheets

(51) Int. Cl.
- *H04W 72/14* (2009.01)
- *H04W 72/04* (2009.01)
- *H04W 76/36* (2018.01)
- *H04W 80/02* (2009.01)
- *H04W 76/11* (2018.01)
- *H04W 76/27* (2018.01)

(52) U.S. Cl.
CPC ....... *H04W 72/1273* (2013.01); *H04W 72/14* (2013.01); *H04W 76/11* (2018.02); *H04W 76/27* (2018.02); *H04W 76/36* (2018.02); *H04W 80/02* (2013.01)

(56) References Cited

U.S. PATENT DOCUMENTS

| | | | |
|---|---|---|---|
| 2010/0202389 A1* | 8/2010 | Cai | H04W 72/042 370/329 |
| 2012/0207109 A1* | 8/2012 | Pajukoski | H04L 1/0029 370/329 |
| 2013/0329688 A1* | 12/2013 | Yang | H04W 74/0833 370/329 |
| 2014/0161069 A1 | 6/2014 | Ohta et al. | |
| 2014/0334403 A1* | 11/2014 | Park | H04L 27/2647 370/329 |
| 2015/0230238 A1* | 8/2015 | Kim | H04L 5/001 370/329 |
| 2017/0026997 A1* | 1/2017 | Moulsley | H04L 1/18 |
| 2018/0006790 A1* | 1/2018 | Park | H04L 1/1812 |
| 2018/0034610 A1* | 2/2018 | He | H04L 5/14 |
| 2018/0042016 A1* | 2/2018 | Babaei | H04L 5/0082 |
| 2018/0042043 A1* | 2/2018 | Babaei | H04W 72/1289 |
| 2018/0139734 A1 | 5/2018 | Babaei et al. | |
| 2018/0183551 A1* | 6/2018 | Chou | H04W 72/042 |
| 2018/0242326 A1* | 8/2018 | Aiba | H04W 72/12 |
| 2018/0302889 A1* | 10/2018 | Guo | H04B 7/088 |
| 2018/0302896 A1* | 10/2018 | Nayeb Nazar | H04L 5/0055 |
| 2018/0324889 A1 | 11/2018 | Babaei et al. | |
| 2019/0014564 A1* | 1/2019 | Lee | H04W 72/0406 |
| 2019/0021072 A1* | 1/2019 | Horiuchi | H04L 5/0048 |
| 2019/0045507 A1* | 2/2019 | Sorrentino | H04W 76/14 |
| 2019/0069258 A1* | 2/2019 | Jeon | H04B 7/0695 |
| 2019/0075585 A1* | 3/2019 | Deogun | H04W 72/1257 |
| 2019/0141546 A1* | 5/2019 | Zhou | H04W 72/1294 |
| 2019/0165894 A1* | 5/2019 | Choi | H04L 5/0055 |
| 2019/0174530 A1* | 6/2019 | Kim | H04L 1/0025 |
| 2019/0174533 A1* | 6/2019 | Lee | H04W 72/0406 |
| 2019/0261395 A1* | 8/2019 | Goektepe | H04W 36/0033 |
| 2019/0319739 A1* | 10/2019 | Kang | H04B 7/0456 |
| 2019/0349908 A1* | 11/2019 | Talarico | H04W 72/042 |
| 2019/0363843 A1* | 11/2019 | Gordaychik | H04W 52/58 |
| 2019/0373560 A1* | 12/2019 | Ouchi | H04W 72/0446 |
| 2020/0084006 A1* | 3/2020 | Rahman | H04L 5/0057 |
| 2020/0112417 A1* | 4/2020 | Park | H04L 1/1861 |
| 2020/0128363 A1* | 4/2020 | Yavuz | H04L 1/0003 |
| 2020/0187237 A1* | 6/2020 | Su | H04W 72/0453 |
| 2020/0267755 A1* | 8/2020 | Ugurlu | H04W 72/042 |
| 2020/0275425 A1* | 8/2020 | Cao | H04W 4/44 |
| 2020/0314886 A1* | 10/2020 | Cohen | H04W 72/1268 |
| 2020/0336227 A1* | 10/2020 | Takeda | H04L 5/005 |
| 2020/0351931 A1* | 11/2020 | Babaei | H04W 76/27 |
| 2020/0358504 A1* | 11/2020 | Takeda | H04W 72/042 |
| 2021/0075560 A1* | 3/2021 | Baldemair | H04L 1/1854 |
| 2022/0061074 A1* | 2/2022 | Babaei | H04L 5/0053 |

OTHER PUBLICATIONS

CMCC: "Outstanding Issues for Multiple SPSs-CGs Support," 3GPP Draft, 3GPP TSG-RAN WG2 #105bis, R2-1904355, vol. RAN WG2. No. Xi 'an. China; Apr. 8, 2019-Apr. 12, 2019, Mar. 29, 2019 (Mar. 29, 2019), XP051693575, 7 pages, Retrieved from the Internet: URL: http://www.3gpp.org/ftp/tsg%5Fran/WG2%5FRL2/TSGR2%5F105bis/Docs/R2%2D1904355%2Ezip the whole document.

International Search Report and Written Opinion—PCT/US2020/033170—ISA/EPO—dated Jul. 24, 2020.

NTT Docomo, et al., "Physical Layer Enhancements for DL SPS," 3GPP Draft, 3GPP TSG RAN WG1 #97, R1-1906219, vol. RAN WG1. No. Reno. USA, May 13, 2019-May 17, 2019, May 13, 2019 (May 13, 2019), XP051727673, 7 pages, Retrieved from the Internet: URL:http://www.3gpp.org/ftp/Meetings%5F3GPP%5FSYNC/RAN1/Docs/R1%2D1906219%2Ezip the whole document.

ZTE: "Enhancements for DL SPS Configurations," 3GPP Draft, 3GPP TSG RAN WG1 #97, R1-1906416, vol. RAN WG1. No. Reno, USA; May 13, 2019-May 17, 2019, May 13, 2019 (May 13, 2019), XP051727866, 5 pages, Retrieved from the Internet: URL:http://www.3gpp.org/ftp/Meetings%5F3GPP%5FSYNC/RAN1/Docs/R1%2D1906416%2Ezip the whole document.

* cited by examiner

JOINT ACTIVATION AND/OR RELEASE FOR MULTIPLE CONFIGURED GRANT AND/OR SEMI-PERSISTENT SCHEDULING CONFIGURATIONS

CROSS-REFERENCE TO RELATED APPLICATION

This application claims priority to U.S. Provisional Application No. 62/868,632, filed on Jun. 28, 2019, entitled "JOINT ACTIVATION AND/OR RELEASE FOR MULTIPLE CONFIGURED GRANT AND/OR SEMI-PERSISTENT SCHEDULING CONFIGURATIONS," which is hereby expressly incorporated by reference herein.

FIELD OF THE DISCLOSURE

Aspects of the present disclosure generally relate to wireless communication and to techniques and apparatuses for joint activation and/or release for multiple configured grant and/or semi-persistent scheduling configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a single downlink control information (DCI) message, and mapping a bit sequence in the single DCI message to a configuration set that includes multiple downlink semi-persistent scheduling (SPS) configurations or multiple uplink configured grant (CG) configurations to be jointly activated or released.

In some aspects, a UE for wireless communication may include a memory and one or more processors operatively coupled to the memory. The memory and the one or more processors may be configured to receive a single DCI message, and map a bit sequence in the single DCI message to a configuration set that includes multiple downlink SPS configurations or multiple uplink CG configurations to be jointly activated or released.

In some aspects, a non-transitory computer-readable medium may store one or more instructions for wireless communication. The one or more instructions, when executed by one or more processors of a UE, may cause the one or more processors to receive a single DCI message, and map a bit sequence in the single DCI message to a configuration set that includes multiple downlink SPS configurations or multiple uplink CG configurations to be jointly activated or released.

In some aspects, an apparatus for wireless communication may include means for receiving a single DCI message, and means for mapping a bit sequence in the single DCI message to a configuration set that includes multiple downlink SPS configurations or multiple uplink CG configurations to be jointly activated or released.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
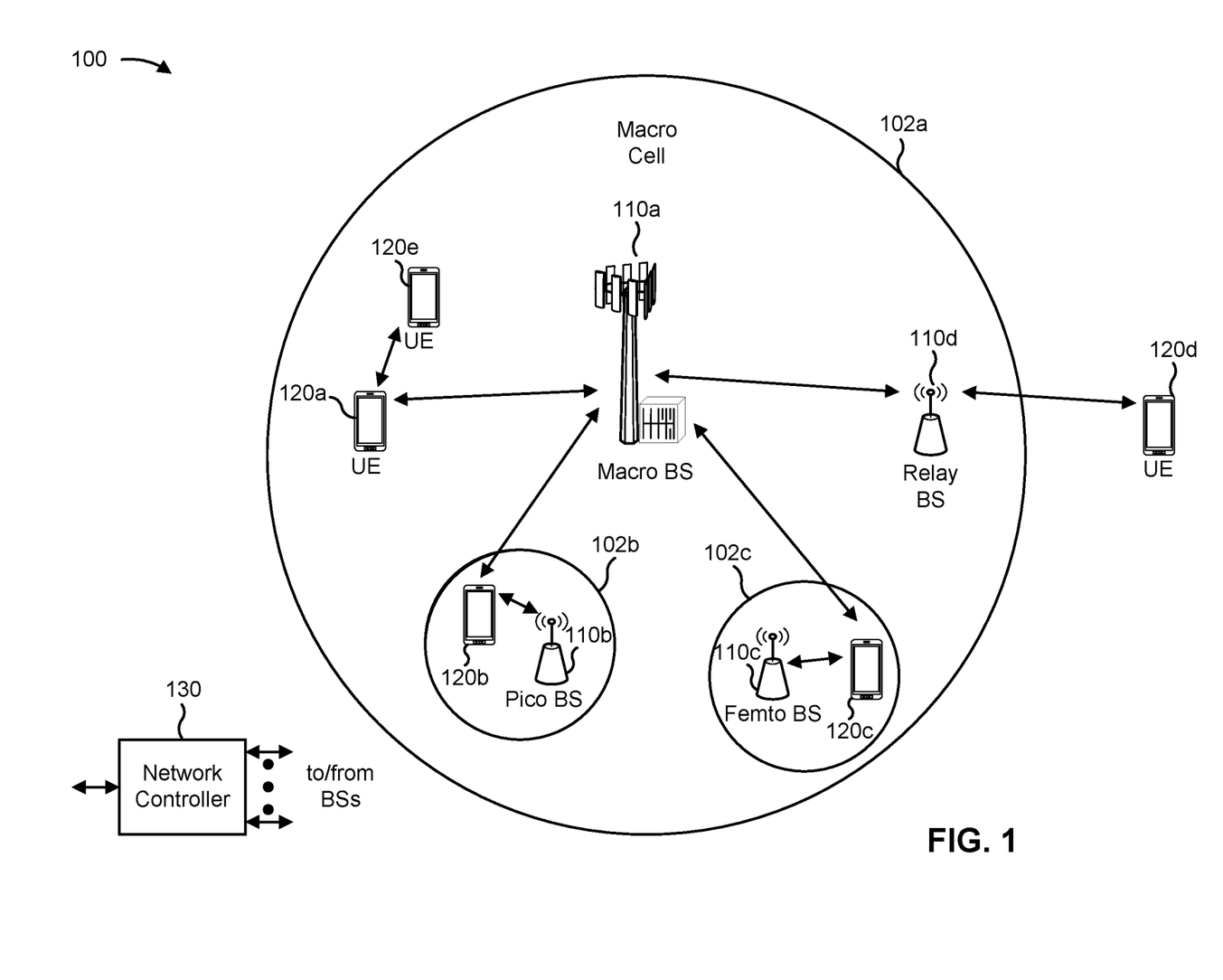
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
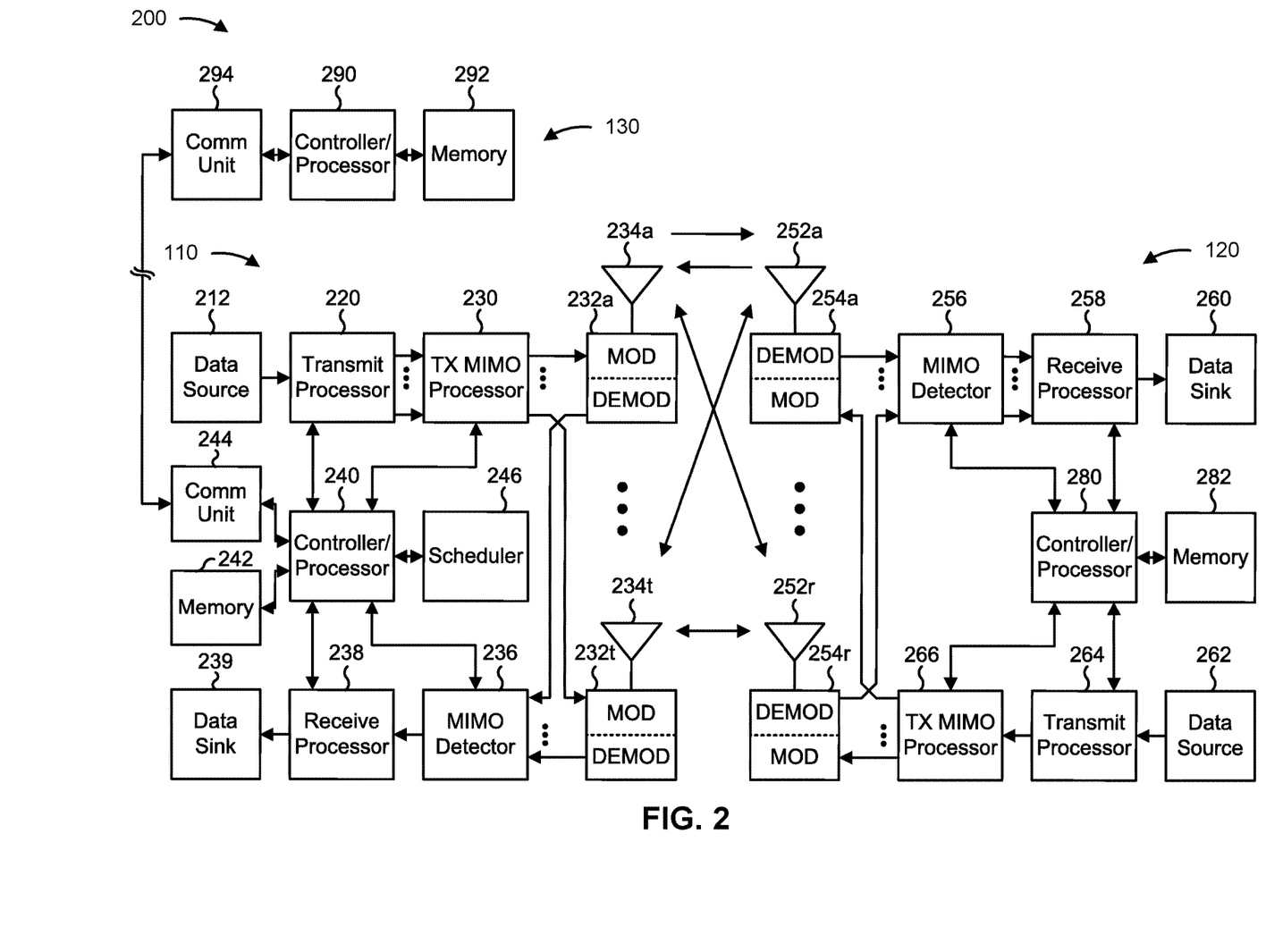
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with joint activation and/or release for multiple configured grant and/or semi-persistent scheduling configurations, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 400 of FIG. 4 and/or other processes as described herein. A scheduler 246 may schedule UEs for data transmission on the downlink and/or uplink.

In some aspects, UE 120 may include means for receiving a single downlink control information (DCI) message, means for mapping a bit sequence in the single DCI message to a configuration set that includes multiple downlink semi-persistent scheduling configurations or multiple uplink configured grant configurations to be jointly activated or released, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Semi-persistent scheduling (SPS) enables radio resources to be semi-statically configured and allocated to a UE for a longer time period than one subframe, which may avoid the need for specific downlink assignment messages and/or uplink grant messages over a physical downlink control channel (PDCCH) for each subframe. To configure SPS, radio resource control (RRC) signaling may indicate an interval at which the radio resources are periodically assigned. PDCCH signaling may indicate specific transmission resource allocations in the time/frequency domain and transmission attributes (e.g., periodicity, modulation and control scheme (MCS), time offset, transmit power, and/or the like). For SPS in LTE UL, non-adaptive synchronous hybrid automatic repeat request (HARD) is performed. For example, non-adaptive retransmissions may be performed on a same resource and with a same MCS as was used for a last (e.g., previous) transmission. For SPS in LTE DL, adaptive asynchronous HARQ is performed. For example, adaptive retransmissions may be performed on a resource and, if provided, with the MCS indicated on the PDCCH.

Furthermore, in order to support certain service types (e.g., ultra reliable low latency communication (URLLC), enhanced mobile broadband (eMBB), massive machine-type communications (MMTC), and/or the like) that may have different requirements with respect to reliability, latency, data rates, communication range, and/or the like, NR UL defines two types of UL data transmissions that may be performed without a grant, generally referred to as a configured grant (CG). More particularly, in a Type 1 CG configuration, a UE can perform UL data transmission without a grant based at least in part on RRC (re)configuration without any L1 signaling, and in a Type 2 CG configuration, the UE can perform UL data transmission without a grant based at least in part on RRC (re)configuration in combination with L1 signaling to activate and/or release the Type 2 CG configuration.

In some instances, a UE can be provided with multiple downlink SPS configurations for a given bandwidth part (BWP) of a serving cell and/or multiple Type 2 uplink configurations. For example, in some cases, a given UE may be associated with up to sixteen (16) different downlink SPS configurations and up to twelve (12) different Type 2 uplink CG configurations. However, one challenge that arises when a UE is associated with multiple downlink SPS configurations and/or multiple Type 2 uplink configurations relates to activating and/or releasing the configurations. For example, as mentioned above, a Type 2 uplink CG configuration is initially indicated to the UE in an RRC configuration, and subsequent L1 signaling via downlink control information (DCI) is used to activate and/or release the Type 2 CG configuration. Accordingly, before the UE can perform uplink transmissions according to a Type 2 CG configuration, the UE has to receive a DCI message activating the Type 2 CG configuration. Furthermore, a similar approach is typically used for a downlink SPS configuration, which is initially indicated in an RRC configuration and a subsequent DCI message activates and/or releases the downlink SPS configuration.

In current approaches, different downlink SPS configurations and different Type 2 uplink CG configurations are activated and released individually. In other words, a base station needs to send N DCI messages to a UE in order to activate N downlink SPS configurations, and the same applies when separately releasing the downlink SPS configurations, separately activating and/or releasing different Type 2 uplink CG configurations, and/or the like. Accordingly, the current approach of having separate activations and separate releases for different SPS configurations, different Type 2 uplink CG configurations, and/or the like increases network overhead and consumes substantial resources at the base station and the UE because the base station has to prepare and transmit multiple DCIs, the network has to transport the multiple DCIs, the UE has to receive and process the multiple DCIs, and/or the like.

Some aspects described herein provide techniques and apparatuses for using a single DCI message to jointly activate and/or release multiple downlink SPS configurations, multiple Type 2 uplink CG configurations, and/or the like. For example, in some aspects, different SPS and/or CG configurations associated with a UE may be divided or otherwise grouped into different sets, and a bit sequence in a single DCI message can be used to indicate multiple SPS and/or CG configurations that are to be jointly activated and/or released. For example, the bit sequence may include a codepoint that indicates an index associated with a particular SPS and/or CG configuration to be activated or released, and all SPS and/or CG configurations that are members of the set that includes the particular SPS and/or CG configuration may be jointly activated and/or released. Additionally, or alternatively, the bit sequence may include a bitmap in which each individual bit corresponds to a particular set, which can be used to indicate multiple sets that are to be jointly activated and/or released. In another example, different configurations may be associated with different sets, and an individual configuration may be activated and/or released based at least in part on whether the bitmap indicates that all sets including the individual configuration are to be activated or released. In addition, as described in further detail elsewhere herein, some aspects may provide for techniques and apparatuses to jointly acknowledge multiple SPS and/or CG configurations that have been activated or released.

In this way, by jointly activating and/or releasing multiple downlink SPS configurations, multiple uplink CG configurations, and/or the like using a single DCI message, aspects described herein may conserve network resources, base station resources, UE resources, and/or the like relative to current approaches that use multiple DCIs to separately activate and/or release the multiple downlink SPS configurations, the multiple uplink CG configurations, and/or the like. Furthermore, some aspects described herein may constrain a length of the bit sequence in the single DCI message to be less than or equal to a length of a DCI field used for separate activation and/or release, which avoids incurring additional overhead by ensuring that the joint activation and/or joint release technique(s) do not impact a size of the DCI message. In a similar respect, an existing DCI field (e.g., a HARQ process number) may be used to indicate which configuration(s) are to be activated and/or released, thus avoiding a need to introduce a new DCI field to indicate which configuration(s) are to be activated and/or released, which would otherwise require that the new DCI field be padded in a Cell Radio Network Temporary Identifier (C-RNTI) to avoid increasing the DCI size.

Figure 3:
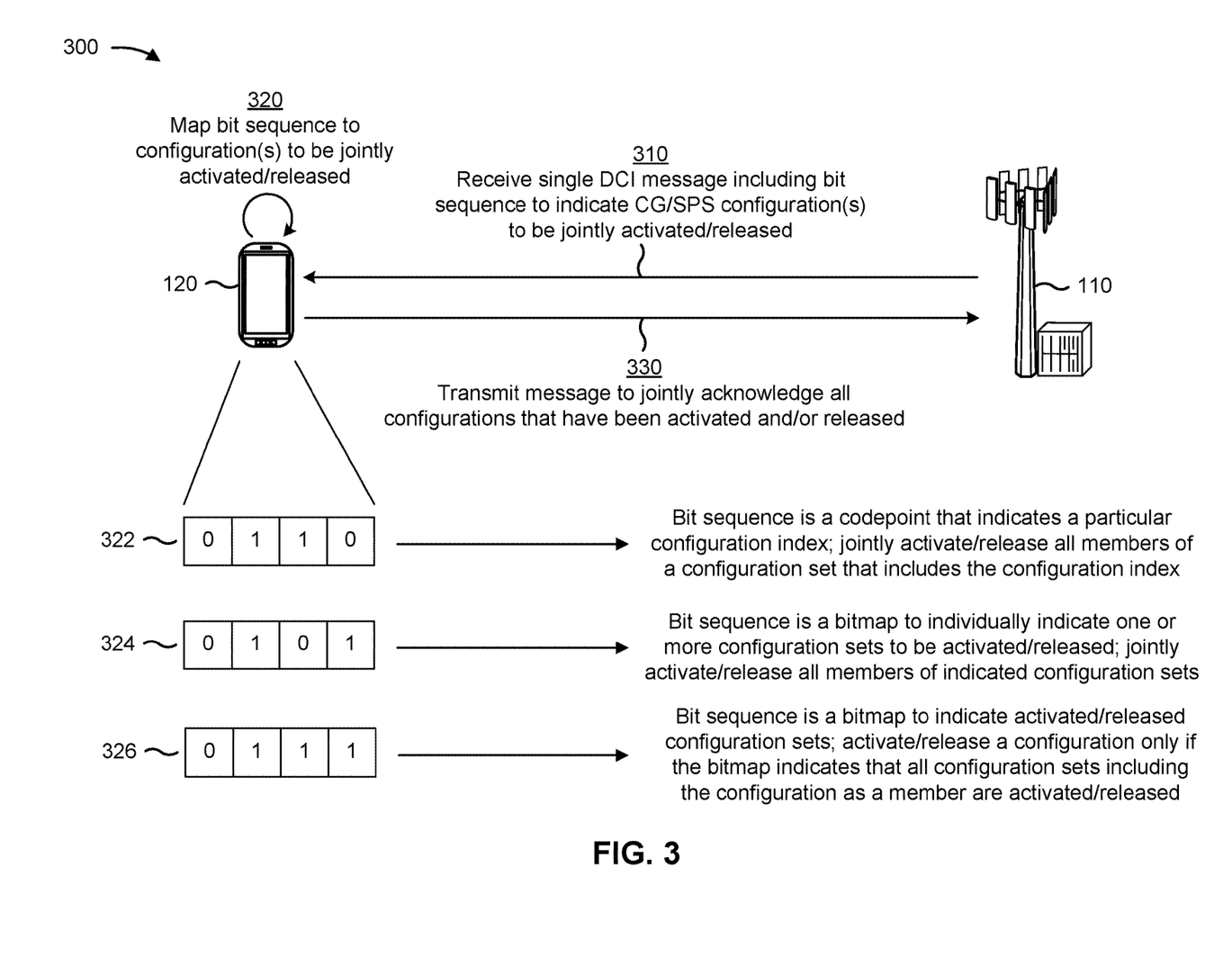
FIG. 3 is a diagram illustrating an example of joint activation and/or release for multiple configured grant and/or semi-persistent scheduling configurations, in accordance with various aspects of the present disclosure.

FIG. 3 is a diagram illustrating an example 300 of joint activation and/or scheduling for multiple uplink CG configurations and/or multiple downlink SPS configurations, in accordance with various aspects of the present disclosure. As shown, example 300 includes a UE 120 (hereinafter referred to as a UE) and a base station 110 (hereinafter referred to as a BS). In general, the UE may be associated with multiple Type 2 uplink CG configurations that are indicated in an RRC configuration and subsequently activated and/or released, and the Type 2 uplink CG configurations are hereinafter referred to as "CG configurations" for simplicity. Additionally, or alternatively, the UE may be associated with multiple downlink SPS configurations, which are hereinafter referred to as "SPS configurations" for simplicity.

As shown in FIG. 3, and by reference number 310, the BS may transmit, and the UE may receive, a single DCI message that includes a bit sequence to indicate CG and/or SPS configurations to be jointly activated and/or released. In particular, as mentioned above, the CG and/or SPS configurations may be indicated to the UE in an RRC configuration, and a subsequent DCI message may be communicated to the UE in order to activate and/or release the CG and/or SPS configurations. For example, after the UE receives a DCI message to activate a particular CG configuration, the UE may perform uplink transmissions according to the activated CG configuration, and the UE may subsequently cease to perform uplink transmissions according to the CG configuration after receiving another DCI message to release the CG configuration. In a similar respect, after the UE receives a DCI message to activate a particular SPS configuration, the UE may receive scheduled downlink transmissions according to the activated SPS configuration, and the UE may cease to receive downlink transmissions according to the SPS configuration after receiving another DCI message to release the SPS configuration. Accordingly, in FIG. 3, the single DCI message received by the UE may be communicated to jointly activate one or more CG configurations, to jointly release one or more CG configurations, to jointly activate one or more SPS configurations, to jointly release one or more SPS configurations, and/or the like.

As further shown in FIG. 3, and by reference number 320, the UE may map the bit sequence in the single DCI message to one or more CG and/or SPS configurations to be activated and/or released. In some aspects, various different techniques can be used to determine the mapping between the bit sequence and the CG/SPS configurations to be activated and/or released.

In a first technique, as shown by reference number 322, the bit sequence may be a codepoint that indicates a particular configuration index (e.g., an index associated with a particular CG configuration or a particular SPS configuration), and the particular configuration index may be used as a proxy to jointly activate or release all members of a configuration set that includes the particular configuration index as a member. For example, as mentioned above, the UE may be permitted to have up to 12 uplink CG configurations and up to 16 downlink SPS configurations. Accordingly, in some aspects, a bit sequence with 4 bits may be sufficient to define a configuration index for each uplink CG configuration and/or downlink SPS configuration associated with the UE (e.g., four bits may yield up to 16 codepoints that can correspond to up to 16 different configuration indices, and more generally, N bits may yield up to $2^N$ codepoints that can correspond to up to $2^N$ different configuration indices).

Furthermore, as mentioned above, multiple uplink CG configurations and/or multiple downlink SPS configurations that are associated with the UE may be divided into different sets in the first technique. For example, because different service types (e.g., URLLC, eMBB, MMTC, and/or the like) may generally share various parameters (e.g., with respect to latency, data rate, and/or the like), configurations that belong to the same service type may grouped within the same configuration set. In some aspects, a mapping between the configurations and the configuration sets may be indicated to the UE in an RRC configuration. Accordingly, in the first technique, the UE may identify a codepoint from the bit sequence in the single DCI message, and the codepoint may generally correspond to a configuration index associated with a particular CG configuration or a particular SPS configuration that is to be activated or released. The UE may then jointly activate or release each CG or SPS configuration that is a member of the same set as the particular CG or SPS configuration corresponding to the codepoint indicated in the bit sequence of the single DCI message.

For example, in FIG. 3, the codepoint indicates that a configuration with index '0110' is to be activated or released. The UE may therefore identify the CG or SPS configuration with the index '0110' and jointly activate or release all members of the configuration set that includes the CG or SPS configuration with the index '0110' as a member.

For example, in a case where the UE has 16 downlink SPS configurations, the UE may be configured with 4 configuration sets that have 4 members each, 2 configuration sets that include a first set with 12 members and a second set with 4 members (e.g., the first set may be for a URLLC service type and the second set may be for an eMBB service type), and/or the like. In the former case, all 4 members of the set that includes the configuration with the index '0110' may be jointly activated or released based at least in part on the single DCI message. In the latter case, if the configuration with the index '0110' is a member of the first set, all 12 members of the first set may be jointly activated or released based on the single DCI message; otherwise, all 4 members of the first set may be jointly activated or released based on the configuration with the index '0110' being a member of the second set. In other words, all members of a configuration set may be jointly activated or released when the codepoint indicates that an individual configuration index within that configuration set is to be activated or released, whereby individual configuration indices are used as proxies to represent all members of the corresponding configuration sets.

In some aspects, the first technique described above can generally be used to indicate, within a single DCI message, a codepoint associated with an individual CG and/or SPS configuration in order to jointly activate and/or release all CG and/or SPS configurations that are grouped with the individual CG and/or SPS configuration within an individual configuration set based on having a common service type. Thus, in the first technique, one configuration set (which may have one or multiple members) can be activated and/or released within a single DCI message. Accordingly, in some aspects, efficiency may be increased by using a single DCI message to jointly activate and/or release multiple configuration sets, each of which may include one or multiple members. For example, as mentioned above, configurations that have a particular service type may be grouped together within the configuration sets. Additionally, or alternatively, configurations with a common service type may be distributed among different configuration sets, with members of the respective configuration sets sharing one or more parameters (e.g., a configuration set may include a first CG configuration for URLLC and a second CG configuration for eMBB based on the first and second CG configurations having a common periodicity, modulation coding scheme (MCS), time offset, and/or the like).

Accordingly, in a second technique, as shown by reference number 324, the bit sequence may be a bitmap to individually indicate one or more configuration sets to be activated and/or released, and all members of the indicated configuration sets may be jointly activated and/or released. In some aspects, in the second technique, a length of the bit sequence may generally correspond to a quantity of different configuration sets, whereby each bit in the bit sequence may correspond to an individual configuration set. For example, if the bit sequence has a length of 4 bits as illustrated in FIG. 3, the UE may be configured with up to 4 configuration sets that may have an equal or unequal number of members (e.g., the UE may have 4 configuration sets that each have up to 4 members, 3 configuration sets that have 5 members and 1 set that has 1 member, and/or the like). Accordingly, in the second technique, the bit sequence in the single DCI message may indicate one or more configuration sets that are to be jointly activated or released, and all CG and/or SPS configurations that are members of a configuration set that is indicated to be activated or released may be activated or released together.

For example, in FIG. 3, the bitmap includes 4 bits to represent four individual configuration sets, each of which may have one or more members. In FIG. 3, the bitmap includes the bit sequence '0101' to indicate that the second and fourth configuration sets are to be activated or released (e.g., based on the second and fourth bits being set to '1'). The UE may therefore identify all of the CG and/or SPS configurations that are members of the second configuration set and all of the CG and/or SPS configurations that are members of the fourth configuration set, and the identified configurations may be jointly activated or released based on the bitmap in the single DCI message.

According to various aspects, in the first technique and/or the second technique described above, a single Configured Scheduling Radio Network Temporary Identifier (CS-RNTI) may be associated with multiple uplink CG configurations, multiple downlink SPS configurations, and/or the like. In particular, the CS-RNTI generally corresponds to a unique identification for the UE that is used to manage resources associated with uplink CG configurations, downlink SPS configurations, and/or the like. For example, with respect to Type 2 uplink CG configurations, RRC may define a periodicity of the uplink CG configuration while a PDCCH addressed to a CS-RNTI can be used as a signal to either activate or release the uplink CG configuration (e.g., a PDCCH addressed to the CS-RNTI may indicate that the uplink CG configuration can be implicitly reused according to the periodicity defined by RRC until released). In addition, with a downlink SPS configuration, RRC may define a periodicity of the configured downlink assignments while a PDCCH addressed to the CS-RNTI can activate and/or release the configured downlink assignment (e.g., a PDCCH addressed to the CS-RNTI may indicate that the downlink assignment can be implicitly reused according to the periodicity defined by RRC until released).

Accordingly, in the first technique and/or the second technique described above, different configuration sets can be associated with different CS-RNTIs, and the CS and/or SPS configurations that are jointly activated or released may be constrained to those configurations that are associated with the same CS-RNTI. For example, in some aspects, the UE may be associated with multiple CS-RNTIs, and each CS-RNTI may correspond to a particular configuration set that contains one or more multiple configurations that can be jointly activated or released. In this way, with multiple different CS-RNTIs, the bit sequence in the DCI that is used to jointly activate or release uplink CG configurations, downlink SPS configurations, and/or the like may be reduced, thus achieving greater reliability.

As described above, in the first technique and the second technique, all the members of a configuration set are jointly activated or jointly released based on the codepoint and/or bitmap indicated in the single DCI message. In a third technique, as shown by reference number 326, the bit sequence is a bitmap to indicate one or more configuration sets to be activated or released (e.g., in a similar manner as in the second technique). However, in the third technique, one or more CG and/or SPS configurations may be associated with multiple configuration sets, and an individual configuration may be activated or released only if all of the configuration sets that include the individual configuration as a member are activated or released. For example, a mapping between configurations and one or more associated configuration sets may be RRC configured (e.g., based on service type, periodicity, MCS, time offset, and/or the like), and each configuration set may be associated with an index. Accordingly, the bitmap in the single DCI message may indicate one or more configuration set indices that are to be activated or released, and a particular configuration may be activated or released if all the configuration set indices associated with the configuration set are activated or released. In this way, by associating individual configurations with one or more configuration sets, a single DCI message can be used to jointly activate or release multiple configurations individually rather than having to activate or release every member of a configuration set together.

For example, in FIG. 3, the bitmap in the single DCI message includes a bit sequence '0111' that may correspond to {set4, set3, set2, set1}. Accordingly, in an example where a first configuration is associated with set1 and set2, a second configuration is associated with set1, and a third configuration is associated with set3 and set4, the bitmap '0111' activates or releases the first configuration and the second configuration but not the third configuration. In particular, the bitmap '0111' activates or releases set1, set2, and set3, whereby the first configuration and the second configuration are activated or released because all the configuration sets associated with the first configuration are activated or released and all the configuration sets associated with the second configuration are activated or released. However, because the first bit in the bitmap (corresponding to set4) has a value of '0', set4 is not activated or released by the single DCI message. Accordingly, because the third configuration is associated with set4, the third configuration is not activated or released by the single DCI message.

In some aspects, the bit sequence in the single DCI message may be based on a PDCCH validation procedure used to validate scheduling activation and/or release where multiple Type 2 uplink CG configurations, multiple downlink SPS configurations, and/or the like are supported per bandwidth part. For example, a new field may be defined to indicate within the single DCI message the configuration(s) and/or configuration set(s) to be activated or released, and the new field may be padded in a Cell RNTI (C-RNTI) to adhere to the above-mentioned constraint to maintain the DCI size. Additionally, or alternatively, one or more existing DCI fields may be reinterpreted or repurposed to indicate the configuration(s) and/or configuration set(s) to be activated or released. For example, an existing DCI field that may be reinterpreted or repurposed may be a HARQ process number, which is a 4-bit field. In this way, by reinterpreting or repurposing an existing field, a need to pad a new field in the C-RNTI may be avoided. Furthermore, in cases where HARQ indices are divided among different CG and/or SPS configurations, the HARQ index that belongs to a CG and/or SPS configuration can be used to activate or release the corresponding configuration (e.g., the codepoint in the first technique described above may indicate the HARQ index that corresponds to a particular CG and/or SPS configuration). For example, the above-mentioned field for the HARQ process number has 4 bits because there can be up to 16 HARQ indices, and these HARQ indices can be divided among different CG and/or SPS configurations. For example, if the UE has four CG configurations, the 16 HARQ indices can be divided among the four CG configurations (e.g., 4 HARQ indices per CG configuration). Accordingly, in any of the first through third techniques, the bit sequence in the single DCI message may indicate one of the HARQ indices associated with a particular CG configuration, a particular SPS configuration, and/or the like to be activated or released. In other words, the HARQ indices can be used as proxies for the CG and/or SPS configurations to be activated or released.

As further shown in FIG. 3, and by reference number 330, the UE may transmit, to the B S, a message to jointly acknowledge all CG and/or SPS configurations that were activated and/or released by the single DCI message. For example, in the case of an SPS configuration that is activated or released, the UE may acknowledge the activation or release by transmitting the acknowledgement in a codebook through a physical uplink control channel (PUCCH) resource, and in the case of a CG configuration that is activated or released, the UE may acknowledge the activation or release by transmitting the acknowledgement through a medium access control (MAC) control element (MAC-CE).

In some aspects, based on the single DCI message activating or releasing one or more SPS configurations, the UE may use different techniques to determine the PUCCH resource to be used to transmit the acknowledgement and/or a location of an acknowledgement bit in the codebook (e.g., an individual bit used to acknowledge all of the SPS configurations that were activated or released). In general, when SPS configurations are individually activated or released, a location of the acknowledgement bit in the codebook is associated with the physical downlink shared channel (PDSCH) corresponding to the individually activated or released SPS configuration (e.g., based on a time domain resource allocation (TDRA) table). Accordingly, as described herein, different techniques may be applied to determine the PUCCH resource to be used to transmit the acknowledgement and/or the location of the acknowledgement bit in the codebook for cases where multiple SPS configurations are jointly activated or released.

More particularly, in some aspects, the UE may receive multiple PDSCHs, including an SPS PDSCH, a dynamic PDSCH, and/or the like. If the multiple PDSCHs have the same PUCCH for acknowledgement (ACK) and negative acknowledgement (NACK), the UE may multiplex the ACK-NACKs for the multiple PDSCHs and determine a location in the codebook for the ACK-NACK corresponding to each PDSCH. For example, in some aspects, the PUCCH resource to be used to transmit the acknowledgement bit may be defined by the single DCI message indicating the SPS configuration(s) to be activated or released (e.g., when there is only SPS traffic and there is no multiplexing of a HARQ-ACK with a dynamic PDSCH). In this example, the codebook size is only one bit because there is only SPS traffic, so the UE does not need to further determine the location in the codebook for the acknowledgement bit.

In another example, for dynamic (e.g., Type 2) codebook construction where a HARQ-ACK for SPS PDSCH release and a HARQ-ACK for a dynamic PDSCH release are multiplexed, the PUCCH resource may be indicated by a PUCCH resource indicator (PRI) of a last (e.g., preceding or most recent) DCI message and the location of the acknowledgement bit in the codebook may be given by the single DCI message that was used to activate or release the one or more SPS configurations.

In another example, for semi-static (e.g., Type 1) codebook construction where a HARQ-ACK for both an SPS release and a dynamic PDSCH release are multiplexed (e.g., there is SPS and non-SPS traffic), a location in the semi-static HARQ-ACK codebook for HARQ-ACK information that corresponds to an SPS PDSCH release is generally the same as for a corresponding SPS PDSCH reception. Accordingly, when a semi-static codebook is used to acknowledge the SPS configuration(s) activated or released by the single DCI message, the location of the acknowledgement bit in the codebook may correspond to a PDSCH reception occasion of the SPS configuration given in the codepoint for the codepoint-based activation and/or release techniques described above. Alternatively, for the bitmap-based activation and/or release techniques described above, the location of the acknowledgement bit in the codebook may correspond to a PDSCH reception occasion of a first (e.g., initial) SPS configuration given in a first set of activated or released configurations. With respect to the other PDSCH occasions that correspond to the activated or released SPS configurations, the UE may provide a NACK in the codebook. Alternatively, the UE may provide only the individual acknowledgement bit in the codebook and no bits for the other PDSCH occasions that correspond to the activated or released SPS configurations, which may save codebook size.

In some aspects, whereas the techniques described above relate to techniques that the UE employs to acknowledge a single DCI message activating or releasing one or more SPS configurations, the UE may use different techniques to transmit the acknowledgement through a MAC-CE when the single DCI message is used to activate or release one or more CG configurations. For example, in some aspects, the UE may transmit one or more MAC-CEs to acknowledge the one or more CG configurations that were activated or released, and each MAC-CE may indicate the index corresponding to the CG configuration being acknowledged. Furthermore, each MAC-CE may also indicate whether the acknowledgement is to confirm that the CG configuration was activated or released. Additionally, or alternatively, a bitmap may be used in the confirmation MAC-CE to jointly acknowledge multiple CG configurations that were activated or released, which reduces overhead of the MAC-CE because fewer (e.g., only one) MAC-CEs can be transmitted to acknowledge all of the CG configurations that were activated or released in the single DCI. For example, in some aspects, a size of the bitmap may correspond to a maximum quantity of uplink CG configurations that are supported per bandwidth part of a serving cell (e.g., if the UE can have up to 12 uplink CG configurations, the confirmation MAC-CE may have up to 12 bits, which may be arranged as two octets with 4 reserved bits). Additionally, or alternatively, a bit length of the MAC-CE can be reduced based on a technique used to jointly activate or release multiple CG configurations. For example, if a single DCI includes a codepoint or a bitmap to release multiple CG configurations grouped together in a configuration set, the confirmation MAC-CE can be sent with an indicator that identifies only a single index among the indices associated with the multiple CG configurations.

As indicated above, FIG. 3 is provided as an example. Other examples may differ from what is described with respect to FIG. 3.

Figure 4:
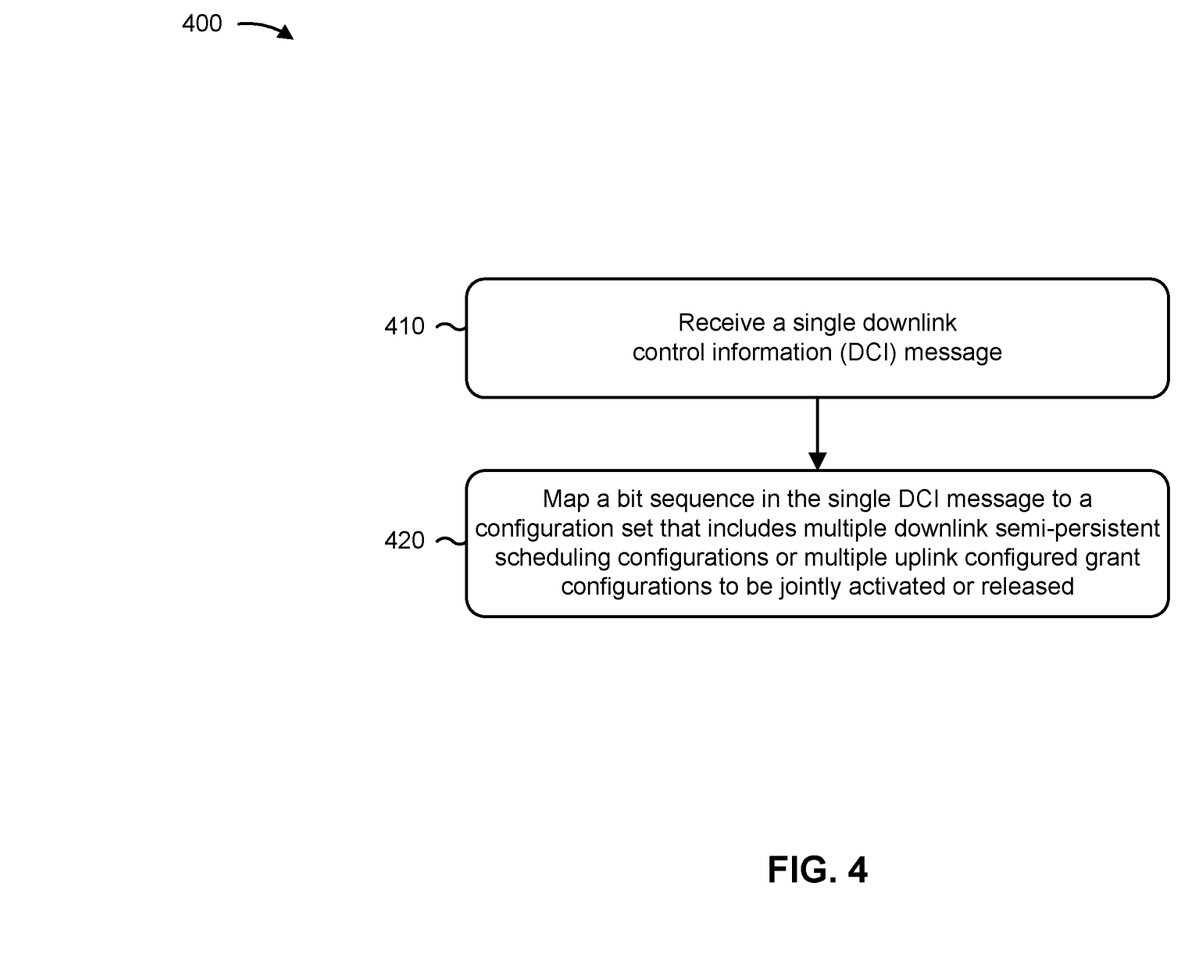
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with joint activation and/or release for multiple CG configurations, multiple SPS configurations, and/or the like using a single DCI message.

As shown in FIG. 4, in some aspects, process 400 may include receiving a single DCI message (block 410). For example, the UE (e.g., using antenna 252, DEMOD 254, MIMO detector 256, receive processor 258, controller/processor 280, memory 282, and/or the like) may receive a DCI message, as described above.

As further shown in FIG. 4, in some aspects, process 400 may include mapping a bit sequence in the single DCI message to a configuration set that includes multiple downlink SPS configurations or multiple uplink CG configurations to be jointly activated or released (block 420). For example, the UE (e.g., using receive processor 258, transmit processor 264, controller/processor 280, memory 282, and/or the like) may map a bit sequence in the single DCI message to a configuration set that includes multiple downlink SPS configurations or multiple uplink CG configurations to be jointly activated or released, as described above.

Process 400 may include additional aspects, such as any single aspect or any combination of aspects described below and/or in connection with one or more other processes described elsewhere herein.

In a first aspect, when mapping the bit sequence in the single DCI message to the configuration set, the UE may identify a codepoint that indicates an index associated with an individual configuration to be activated or released based at least in part on the bit sequence, and the UE may jointly activate or release each configuration in the configuration set based at least in part on determining that the individual configuration to be activated or released is a member of the configuration set.

In a second aspect, alone or in combination with the first aspect, the index is a hybrid automatic repeat request (HARD) index associated with the individual configuration to be activated or released.

In a third aspect, alone or in combination with one or more of the first and second aspects, each configuration in the configuration set is associated with a particular service type.

In a fourth aspect, alone or in combination with one or more of the first through third aspects, when mapping the bit sequence in the single DCI message to the configuration set, the UE may identify an individual bit that corresponds to the configuration set based at least in part on the bit sequence, and the UE may jointly activate or release each configuration in the configuration set based at least in part on the individual bit that corresponds to the configuration set indicating that the configuration set is to be activated or released.

In a fifth aspect, alone or in combination with one or more of the first through fourth aspects, the configuration set is a first configuration set, the individual bit is a first individual bit, the UE may identify a second individual bit that corresponds to a second configuration set based at least in part on the bit sequence in the single DCI message, and the UE may jointly activate or release each configuration in the second configuration set based at least in part on the second individual bit indicating that the second configuration set is to be activated or released.

In a sixth aspect, alone or in combination with one or more of the first through fifth aspects, each configuration in the configuration set is associated with one or more of a particular service type or a particular parameter.

In a seventh aspect, alone or in combination with one or more of the first through sixth aspects, a length of the bit sequence corresponds to a quantity of different configuration sets associated with the UE.

In an eighth aspect, alone or in combination with one or more of the first through seventh aspects, at least one configuration in the configuration set is a member of one or more additional configuration sets, and the at least one configuration is activated or released based at least in part on the bit sequence in the single DCI message indicating that the configuration set and the one or more additional configuration sets are all to be activated or released.

In a ninth aspect, alone or in combination with one or more of the first through eighth aspects, the UE is associated with multiple Configured Scheduling Radio Network Temporary Identifiers (CS-RNTIs) that respectively correspond to multiple configuration sets with one or more downlink SPS configurations or uplink CG configurations that can be jointly activated or released.

In a tenth aspect, alone or in combination with one or more of the first through ninth aspects, the bit sequence is provided in a HARQ process number field of the DCI message.

In an eleventh aspect, alone or in combination with one or more of the first through tenth aspects, the multiple downlink SPS configurations or multiple uplink CG configurations are grouped within the configuration set based at least in part on an indicator in a radio resource control configuration message.

In a twelfth aspect, alone or in combination with one or more of the first through eleventh aspects, a length of the bit sequence is less than or equal to a length of a field in the DCI message used to separately activate or release an individual downlink SPS configuration or an individual uplink CG configuration.

In a thirteenth aspect, alone or in combination with one or more of the first through twelfth aspects, the UE may transmit, through a physical uplink control channel (PUCCH) resource, a codebook that includes an individual acknowledgement bit based at least in part on the bit sequence indicating that the multiple downlink SPS configurations are to be jointly released.

In a fourteenth aspect, alone or in combination with one or more of the first through thirteenth aspects, the PUCCH resource used to transmit the codebook is determined based at least in part on the single DCI message.

In a fifteenth aspect, alone or in combination with one or more of the first through fourteenth aspects, the PUCCH resource used to transmit the codebook is indicated by a PUCCH resource indicator in a most recent DCI message, and a location of the individual acknowledgement bit in the codebook is determined based at least in part on the single DCI message.

In a sixteenth aspect, alone or in combination with one or more of the first through fifteenth aspects, a location of the individual acknowledgement bit in the codebook corresponds to a physical downlink shared channel (PDSCH) reception occasion associated with an individual downlink SPS configuration that corresponds to a codepoint indicated in the bit sequence.

In a seventeenth aspect, alone or in combination with one or more of the first through sixteenth aspects, a location of the individual acknowledgement bit in the codebook corresponds to a PDSCH reception occasion associated with an initial downlink SPS configuration in a first set of downlink SPS configurations that the bit sequence indicates is to be jointly released.

In an eighteenth aspect, alone or in combination with one or more of the first through seventeenth aspects, the codebook further includes a negative acknowledgement for one or more PDSCH reception occasions that correspond to one or more of the multiple downlink SPS configurations to be jointly released.

In a nineteenth aspect, alone or in combination with one or more of the first through eighteenth aspects, the UE may transmit, through a medium access control (MAC) control element, an acknowledgement of the single DCI message based at least in part on the bit sequence indicating that the multiple uplink CG configurations are to be jointly activated or released, and the MAC control element may further indicate an index corresponding to an acknowledged uplink CG configuration and indicate whether the acknowledgement is for a joint activation or a joint release.

In a twentieth aspect, alone or in combination with one or more of the first through nineteenth aspects, the acknowledgement includes a bitmap with a set of bits to jointly acknowledge all of the multiple uplink CG configurations that are to be jointly activated or released.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a single downlink control information (DCI) message;
   mapping a bit sequence in the single DCI message to a configuration set that includes multiple downlink semi-persistent scheduling (SPS) configurations to be jointly released; and
   transmitting, through a physical uplink control channel (PUCCH) resource, a codebook that includes an acknowledgement bit based at least in part on the bit sequence indicating that one or more of the multiple downlink SPS configurations are to be jointly released, wherein the acknowledgement bit is an individual acknowledgement bit used to acknowledge another one of the multiple downlink SPS configurations that was released.

2. The method of claim 1, wherein mapping the bit sequence in the single DCI message to the configuration set includes:
   identifying, based at least in part on the bit sequence, a codepoint that indicates an index associated with an individual configuration to be released; and
   jointly releasing each configuration in the configuration set based at least in part on determining that the individual configuration to be released is a member of the configuration set.

3. The method of claim 2, wherein the index is a hybrid automatic repeat request (HARD) index associated with the individual configuration to be released.

4. The method of claim 2, wherein each configuration in the configuration set is associated with a particular service type.

5. The method of claim 1, wherein mapping the bit sequence in the single DCI message to the configuration set includes:
   identifying, based at least in part on the bit sequence, an individual bit that corresponds to the configuration set; and
   jointly releasing each configuration in the configuration set based at least in part on the individual bit that corresponds to the configuration set indicating that the configuration set is to be released.

6. The method of claim 5, wherein the configuration set is a first configuration set, wherein the individual bit is a first individual bit, and wherein the method further comprises:
   identifying, based at least in part on the bit sequence in the single DCI message, a second individual bit that corresponds to a second configuration set; and
   jointly releasing each configuration in the second configuration set based at least in part on the second individual bit indicating that the second configuration set is to be released.

7. The method of claim 5, wherein each configuration in the configuration set is associated with one or more of a particular service type or a particular parameter.

8. The method of claim 5, wherein a length of the bit sequence corresponds to a quantity of different configuration sets associated with the UE.

9. The method of claim 5, wherein at least one configuration in the configuration set is a member of one or more additional configuration sets, and wherein the at least one configuration is released based at least in part on the bit sequence in the single DCI message indicating that the configuration set and the one or more additional configuration sets are all to be released.

10. The method of claim 1, wherein the UE is associated with multiple Configured Scheduling Radio Network Temporary Identifiers (CS-RNTIs) that respectively correspond to multiple configuration sets with one or more downlink semi-persistent scheduling (SPS) configurations or uplink CG configurations that can be jointly released.

11. The method of claim 1, wherein the bit sequence is provided in a hybrid automatic repeat request (HARD) process number field of the DCI message.

12. The method of claim 1, wherein the multiple downlink SPS configurations are grouped within the configuration set based at least in part on an indicator in a radio resource control (RRC) configuration message.

13. The method of claim 1, wherein a length of the bit sequence is less than or equal to a length of a field in the DCI message used to separately activate or release an individual downlink SPS configuration or an individual uplink CG configuration.

14. The method of claim 1, wherein the PUCCH resource used to transmit the codebook is determined based at least in part on the single DCI message.

15. The method of claim 1, wherein the PUCCH resource used to transmit the codebook is indicated by a PUCCH resource indicator in a most recent DCI message, and wherein a location of the acknowledgement bit in the codebook is determined based at least in part on the single DCI message.

16. The method of claim 1, wherein a location of the acknowledgement bit in the codebook corresponds to a physical downlink shared channel (PDSCH) reception occasion associated with an individual downlink SPS configuration that corresponds to a codepoint indicated in the bit sequence.

17. The method of claim 1, wherein a location of the acknowledgement bit in the codebook corresponds to a physical downlink shared channel (PDSCH) reception occasion associated with an initial downlink SPS configuration in a first set of downlink SPS configurations that the bit sequence indicates is to be jointly released.

18. The method of claim 1, wherein the codebook further includes a negative acknowledgement for one or more physical downlink shared channel (PDSCH) reception occasions that correspond to one or more of the multiple downlink SPS configurations to be jointly released.

19. The method of claim 1, wherein the bit sequence includes a bit sequence with 4 bits.

20. The method of claim 1, wherein the individual acknowledgement bit used is to acknowledge all of the multiple downlink SPS configurations that were released.

21. The method of claim 1, wherein the codebook is a Type-1 hybrid automatic repeat request-acknowledgement (HARQ-ACK) codebook.

22. The method of claim 1, wherein a location of the acknowledgement bit in the codebook corresponds to a physical downlink shared channel (PDSCH) reception occasion associated with the other one of the multiple downlink SPS configurations.

23. A user equipment (UE) for wireless communication, comprising:
a memory; and
one or more processors, operatively coupled to the memory, configured to:
receive a single downlink control information (DCI) message;
map a bit sequence in the single DCI message to a configuration set that includes multiple downlink semi-persistent scheduling (SPS) configurations to be jointly released; and
transmit, through a physical uplink control channel (PUCCH) resource, a codebook that includes an acknowledgement bit based at least in part on the bit sequence indicating that one or more of the multiple downlink SPS configurations are to be jointly released, wherein the acknowledgement bit is an individual acknowledgement bit used to acknowledge another one of the multiple downlink SPS configurations that was released.

24. The UE of claim 23, wherein the one or more processors, when mapping the bit sequence in the single DCI message to the configuration set, are further configured to:
identify, based at least in part on the bit sequence, a codepoint that indicates an index associated with an individual configuration to be released; and
jointly release each configuration in the configuration set based at least in part on determining that the individual configuration to be released is a member of the configuration set.

25. The UE of claim 24, wherein the index is a hybrid automatic repeat request (HARD) index associated with the individual configuration to be released.

26. The UE of claim 23, wherein the one or more processors, when mapping the bit sequence in the single DCI message to the configuration set, are further configured to:
identify, based at least in part on the bit sequence, an individual bit that corresponds to the configuration set; and
jointly release each configuration in the configuration set based at least in part on the individual bit that corresponds to the configuration set indicating that the configuration set is to be released.

27. The UE of claim 23, wherein the bit sequence is provided in a hybrid automatic repeat request (HARD) process number field of the DCI message.

28. The UE of claim 23, wherein the individual acknowledgement bit used is to acknowledge all of the multiple downlink SPS configurations that were released.

29. The UE of claim 23, wherein the codebook is a Type-1 hybrid automatic repeat request-acknowledgement (HARQ-ACK) codebook.

30. The UE of claim 23, wherein a location of the acknowledgement bit in the codebook corresponds to a physical downlink shared channel (PDSCH) reception occasion associated with the other one of the multiple downlink SPS configurations.

31. A non-transitory computer-readable medium storing one or more instructions for wireless communication, the one or more instructions comprising:
one or more instructions that, when executed by one or more processors of a user equipment, cause the one or more processors to:
receive a single downlink control information (DCI) message;
map a bit sequence in the single DCI message to a configuration set that includes multiple downlink semi-persistent scheduling (SPS) configurations to be jointly released; and
transmit, through a physical uplink control channel (PUCCH) resource, a codebook that includes an acknowledgement bit based at least in part on the bit sequence indicating that one or more of the multiple downlink SPS configurations are to be jointly released, wherein the acknowledgement bit is an individual acknowledgement bit used to acknowledge another one of the multiple downlink SPS configurations that was released.

32. The non-transitory computer-readable medium of claim 31, wherein the individual acknowledgement bit used is to acknowledge all of the multiple downlink SPS configurations that were released.

33. An apparatus for wireless communication, comprising:
means for receiving a single downlink control information (DCI) message;
means for mapping a bit sequence in the single DCI message to a configuration set that includes multiple downlink semi-persistent scheduling (SPS) configurations to be jointly released; and
means for transmitting, through a physical uplink control channel (PUCCH) resource, a codebook that includes an acknowledgement bit based at least in part on the bit sequence indicating that one or more of the multiple downlink SPS configurations are to be jointly released, wherein the acknowledgement bit is an individual acknowledgement bit used to acknowledge another one of the multiple downlink SPS configurations that was released.

* * * * *